United States Patent
Regunathan et al.

(10) Patent No.: US 10,735,087 B2
(45) Date of Patent: Aug. 4, 2020

(54) INTERFERENCE REDUCTION WITH OPTIMIZED BANDWIDTH UTILIZATION

(71) Applicant: Hughes Network Systems, LLC, Germantown, MD (US)

(72) Inventors: Murali Regunathan, Germantown, MD (US); David A. Roos, Boyds, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 254 days.

(21) Appl. No.: 15/819,905

(22) Filed: Nov. 21, 2017

(65) Prior Publication Data
US 2019/0158173 A1    May 23, 2019

(51) Int. Cl.
*H04W 24/02*    (2009.01)
*H04B 7/185*    (2006.01)
*H04W 72/04*    (2009.01)

(52) U.S. Cl.
CPC ........ *H04B 7/18513* (2013.01); *H04W 24/02* (2013.01); *H04W 72/046* (2013.01)

(58) Field of Classification Search
CPC ............ H04B 7/18513; H04B 7/18508; H04B 10/118; H04B 7/1851; H04B 7/204; H04B 7/185; H04W 24/02; H04W 72/046; H04W 84/06; H04W 72/0413; H04L 5/0037
See application file for complete search history.

(56) References Cited

U.S. PATENT DOCUMENTS

| | | | |
|---|---|---|---|
| 7,792,070 B1 | 9/2010 | Burr | |
| 2001/0049284 A1 | 12/2001 | Xiangdong et al. | |
| 2012/0263045 A1* | 10/2012 | Fauconnier | H04W 88/06 370/242 |
| 2016/0072613 A1* | 3/2016 | Esserman | H04L 5/0037 370/230 |
| 2017/0215176 A1* | 7/2017 | Chan | H04W 72/046 |
| 2017/0339710 A1* | 11/2017 | Johnson | H04B 7/2041 |

OTHER PUBLICATIONS

International Search Report and Written Opinion in PCT/US2018/061416 dated Feb. 27, 2019.

* cited by examiner

*Primary Examiner* — Kibrom T Hailu
(74) *Attorney, Agent, or Firm* — Bejin Bieneman PLC

(57) ABSTRACT

A computer comprises a processor programmed to identify a plurality of sets of channels. Each set of channels includes first, second and third channels. The first and second channels in each set include uplinks respectively in first and second neighbor beams and have a first bandwidth overlap. The first and third channels in each set share a target and a third downlink included in the third channel has a second bandwidth overlap with a first downlink included in the first channel. the second bandwidth overlap includes a bandwidth corresponding to at least a portion the first bandwidth overlap, such that a signal spectrum in the first bandwidth overlap is included in the second bandwidth overlap. The computer is further programmed to optimize a bandwidth reduction across the plurality of sets of channels.

18 Claims, 8 Drawing Sheets

INTERFERENCE REDUCTION WITH OPTIMIZED BANDWIDTH UTILIZATION

BACKGROUND

Satellite communications systems are subject to interference between channels. Increases in demand for data transmission by these systems are increasing the need to optimize the use of the bandwidth available to the satellite communications system.

DETAILED DESCRIPTION

Figure 1:
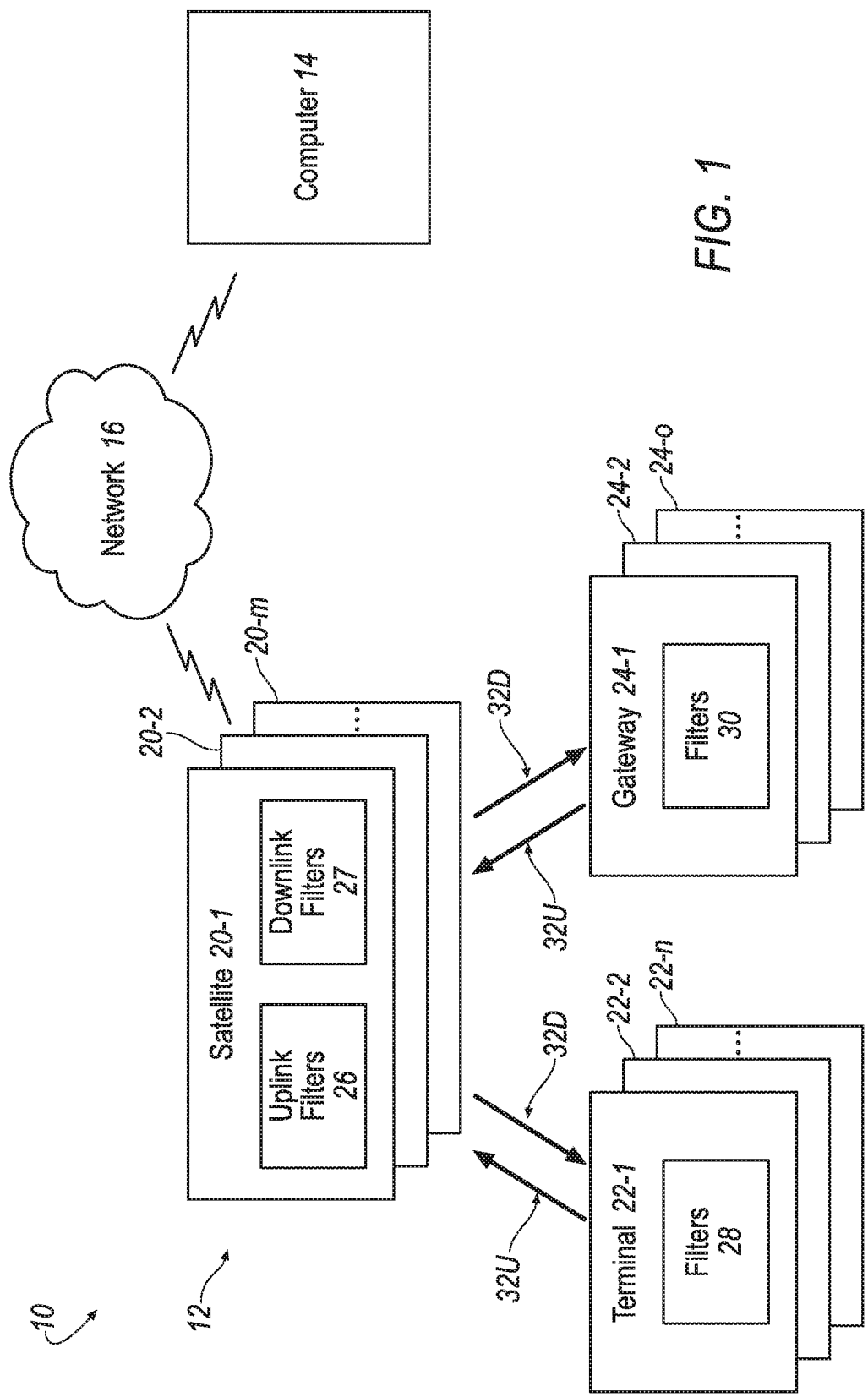
FIG. 1 is a diagram of an exemplary system for optimizing bandwidth reductions for a satellite network.

FIG. 1 illustrates an example system 10 for optimizing bandwidth utilization in a satellite communications network while minimizing or reducing interference. The system 10 includes a first network 12, a computer 14 and a second network 16.

The first network 12 is a satellite communications network and includes satellites 20, terminals 22 and gateways 24. The first network includes a plurality of links 32. The links 32 include uplinks 32U and downlinks 32D. The uplinks 32U are links 32 from the terminals 22 and gateways 24 to the satellite 20. The downlinks are links 32 from the satellite 20 to the terminals 22 and gateways 24. Each link 32 is a range of frequencies dedicated for radio frequency transmission and has a bandwidth. The bandwidth for each link 32 identifies the range of frequencies dedicated to the link. Different portions of a frequency spectrum available to the first network 12 are dedicated respectively to each of the uplinks 32U and downlinks 32D.

Satellites 20 includes one or more satellites 20-1, 20-2 . . . 20-$m$. The reference number 20 is used when this description pertains to each and every of the satellites 20-1, 20-2 . . . 20-$m$. The satellites 20 include relay stations and provide two-way radio frequency (RF) communications between the terminals 22 and the gateways 24. The satellites 20 can be arranged in earth orbits such that the first network 12 can provide communications to terminals 22 and gateways 24 within a geographic area in which the first network 12 operates, with each satellite 20 dedicated to a region within the geographic area at any given time. The geographic area in which the first network 12 operates may be a portion of a country, a country, a portion of a continent, etc. A typical range for the geographic area is in a range from one million to ten million square kilometers, though the geographic area may be smaller or greater than this size.

Each satellite 20 may include a computer, and can be programmed to receive signals via the uplinks 32U, and transmit signals via the downlinks 32D.

As described in additional detail below, each satellite 20 includes one or more uplink filters 26 which is operable to filter signals on the uplinks 32U according to different filter characteristics. The satellite 20 can also be programmed to select a region from which to receive an uplink. For example, the satellite 20 can be programmed to direct receiving antennas on the satellite 20 toward the region, such that signals with a power level from outside the region will be attenuated.

Each satellite 20 further includes one or more downlink filters 27. The downlink filters 27 are operable to filter signals prior to transmission over the downlinks 32D. The satellite 20 can be programmed to direct downlinks 32D to a target region with the geographic area. The target region may be an area on the earth's surface, having a roughly circular or hexagon shape. The size of the region is typically in a range of one thousand to ten thousand square kilometers, though the region may be smaller or larger than this range. That is, the satellite 20 may be programmed to direct an antenna or antenna array such the energy of the transmission is directed toward the region in the geographic area.

Terminals 22 includes one or more terminals 22-1, 22-2, 22-3, . . . 22-$n$ and reference number 22 is used when this description pertains to each and every of the terminals 22-1, 22-2 . . . 22-$n$. The first network 12 may include large numbers (tens of thousands or more) terminals 22. The terminals 22 include transceivers for RF communications with the satellites 20. The terminals 22 further include computers and can be programmed to transmit and receive signals respectively via uplinks 32U and downlinks 32D. The terminals 22 are typically land-based, and may be stationary or mobile. They may be distributed through the geographic area.

Each terminal 22 may include filters 28 for the signals received from first downlinks 32D. The computer in the terminal 22 may be programmed to adjust characteristics of the filters 28 based, for example, on instructions received from the computer 14.

Gateways 24 include one or more gateways 24-1, 24-2 . . . 24-$o$ and reference number 24 is used when this description pertains to each and every of the gateways 24-1, 24-2 . . . 24-$o$. A gateway 24 is typically a conventional land-based transmission system and hosts several radio frequency (RF), baseband transport and gateway-specific management operations. Each gateway 24 includes a computer and is programmed to communicate with multiple terminals 22, via the satellite 20, substantially simultaneously. Communications between the gateway 24 to the satellite 20 are transmitted via the uplinks 32U and the downlinks 32D.

Each gateway 24 may include filters 30 for signals received from the downlinks 32D. The computer in the gateway 24 may be programmed to adjust characteristics of the filters 30 such as the roll-off shapes and corner frequencies based, for example, on instructions received from the computer 14.

Each of the one or more uplink filters 26 and one or more downlink filters 27 included in the satellite 20, the one or more filters 28 included in the terminals 22, and the one or more filters 30 included in the gateways 24 may be implemented conventionally, e.g., as dedicated hardware, as software in a digital signal processor, or a combination of dedicated hardware and software in the digital signal processor.

The computer 14 includes a processor and a memory, the memory storing instructions which may be executed by the processor. The computer 14 is communicatively coupled, via the second network 16 with the first network 12.

As described in additional detail below, the computer 14 is programmed to identify potential interference between pairs of geographically adjacent uplinks 32U, that may be transferred to respective third signals via interference between respective pairs of downlinks 32D to a same gateway 24. The computer 14 may further be programmed to optimize bandwidth reductions of uplinks 32U and downlinks 32D while keeping interference levels to a desired minimum.

The second network 16 is one or more mechanisms by which the first network 12 and the computer 14 communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks (e.g., using one or more of cellular, Bluetooth®, IEEE 802.11, etc.), local area networks (LAN) and/or wide area networks (WAN), including the Internet, providing data communication services.

The types of wireless communications may include one or more of cellular, Bluetooth®, IEEE 802.11 (typically, Wi-Fi®), dedicated short range communications (DSRC), two-way satellite (e.g., emergency services), one-way satellite (e.g., receiving digital audio radio broadcasts), AM/FM radio, etc.

Figure 2A:
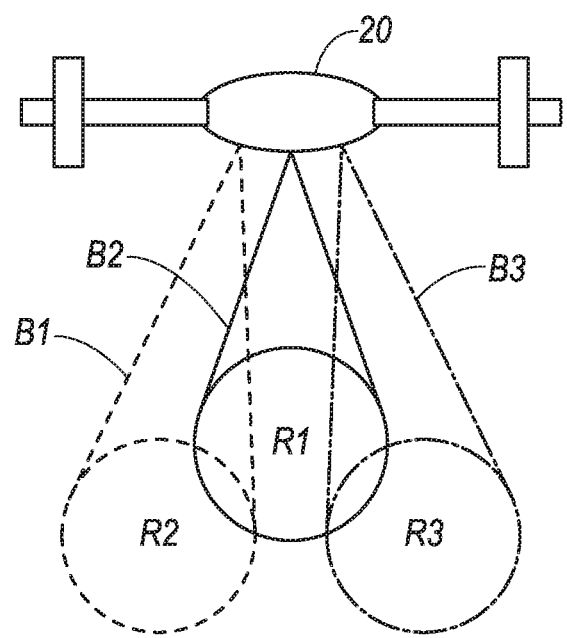
FIG. 2A is a diagram of a satellite including beams.

FIG. 2A is a diagram of an exemplary satellite 20 including first, second and third beams B1, B2, B3 (collectively beams B). Beams B are directional projections of electromagnetic energy from a radio frequency transmitter. The first, second and third beams couple the satellite 20 respectively with first, second and third regions R.

Satellites are arranged to receive signals via uplinks 32U and transmit signals via downlinks organized as beams B. That is, receiver and transmitter antennas on the satellite are arranged to receive/transmit beams B from/to a region. Each of the beams B may include one or more uplinks 32U and/or downlink 32D. In the case of an uplink 32U, a directional transmitter in a terminal 22 or gateway 24 is directed toward a directional receiver in the satellite 20. In the case of a downlink 34, a directional transmitter in the satellite is directed toward a directional receiver in the terminal 22 or gateway 24.

Figure 2B:
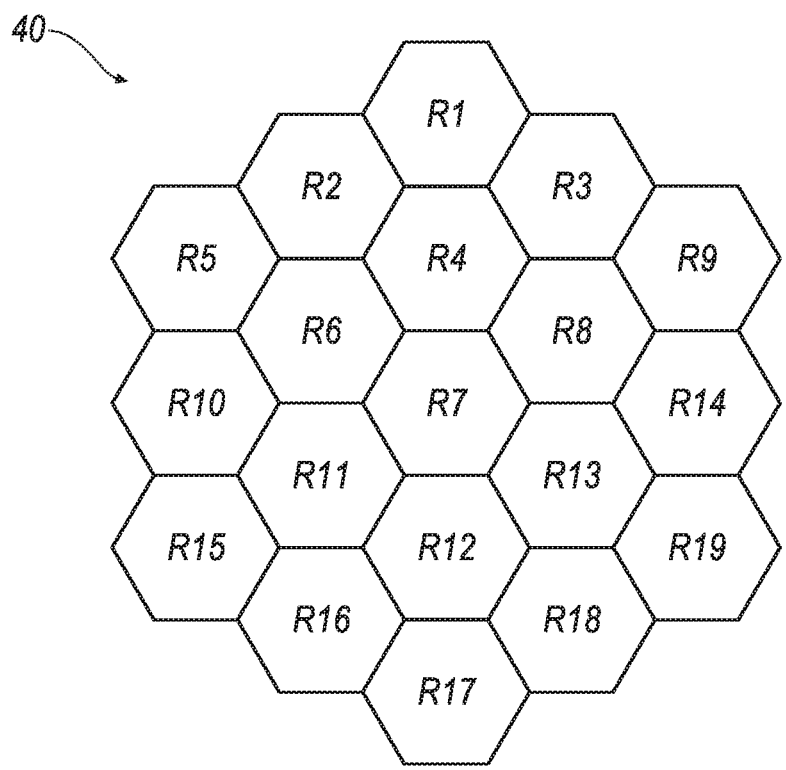
FIG. 2B is a diagram of an exemplary hexagonal beam pattern for satellite communications.

FIG. 2B illustrates an example geographic area 40 for the first network 12. The example geographic area 40 is divided into 19 regions R1-R19 (collectively regions R). The example geographic area 40 is not intended to be limiting. A geographic area for the first network 12 may include any number of regions R.

As described above, each region R typically includes an area in a range of ten thousand to five hundred thousand square kilometers. A region R typically includes from one thousand to twenty thousand terminals 22, though the number of terminals in a region R may be less than or greater than this range. The range of the area and the range of the number of terminals per range are illustrative and not limiting.

The first network 12 is typically programmed to communicate with each of the regions R1-R19 with a respective satellite beam. The satellite beam B includes multiple uplinks 32U and multiple downlinks 32D. For example, a satellite 20 in the first network 12 may communicate with terminals 22 in a first region R1 via a first uplink 32U-1 and a first downlink 32D-1. Although typically communications with each region R1-R19 are provided through a dedicated beam B, this need not be the case. Communications between terminals 22 and gateways 24 in one of the regions R, for example Region R1, may occur via more than one beam B.

Regions are typically arranged in a hexagonal lattice, in which each beam B has six neighbor beams B. For example, the beam B for communications between the satellite 20 and the region R6 has six neighbor beams B for communications respectively between the satellite and the neighbor regions R2, R3, R7, R11, R10 and R5. Because the shape of each beam B is not an exact hexagon, there is typically an overlap between the neighbor beams B. That is, for example, some signal energy from a beam B2 for communications between the satellite and the region R2 may superimpose on (interfere with) a beam B6 for communications between the satellite and the region R6. Although hexagonal lattices are common, any periodic or aperiodic tessellation can be used.

Figure 3:
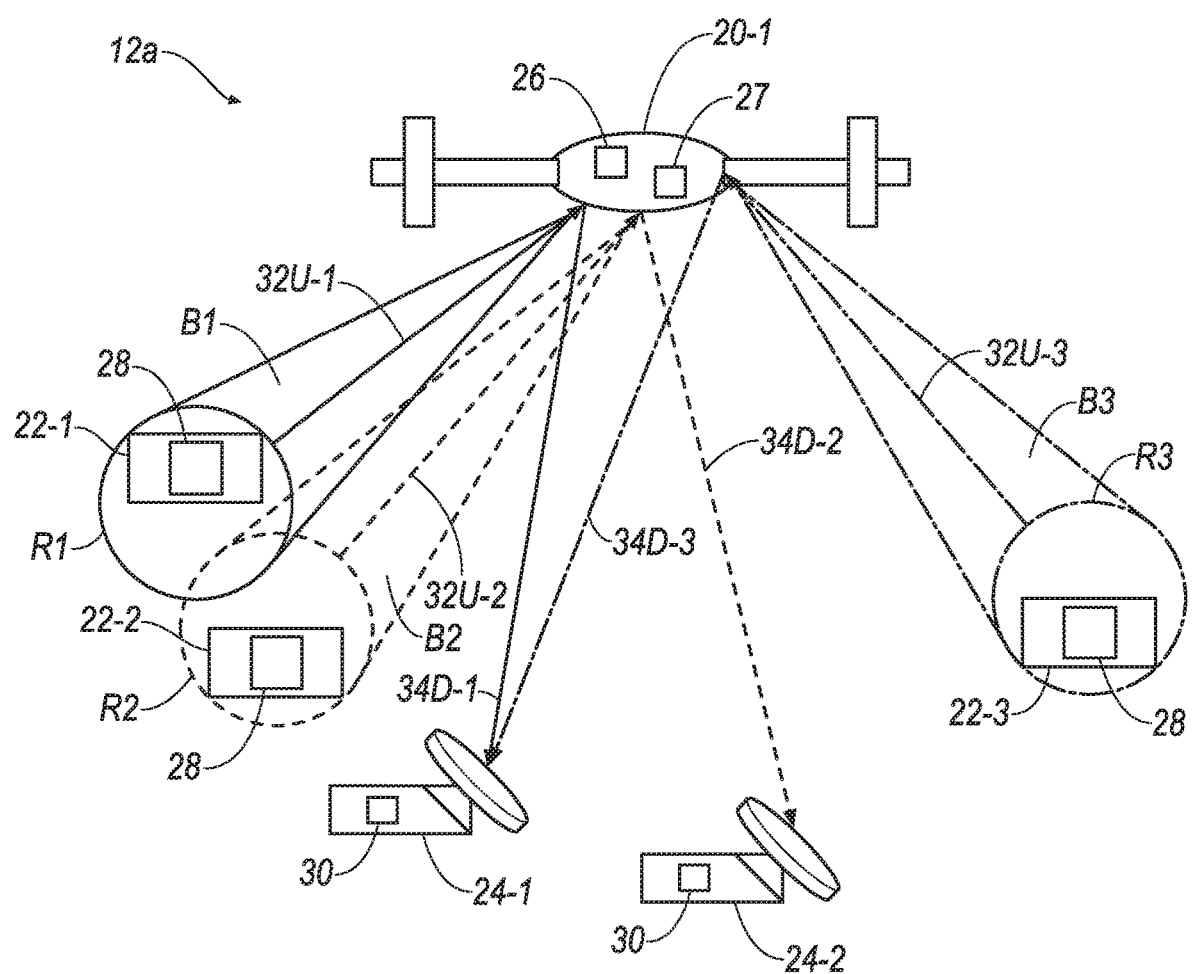
FIG. 3 is a diagram of a section of an exemplary satellite network illustrating a transfer mechanism of interference between a pair of geographically related uplinks and a remote downlink.

FIG. 3 illustrates a subnetwork 12a for satellite communications. The subnetwork 12a may be, for example, a portion of the first network 12. Subnetwork 12a includes a satellite 20-1, first, second, and third terminals, 22-1, 22-2, 22-3, and first and second gateways 24-1, 24-2. The first, second and third terminals 22-1, 22-2, 22-3 are located respectively in first, second and third regions R1, R2, R3.

The satellite 20-1 includes one or more uplink filters 26 and one or more downlink filters 27. Each of the first, second, and third terminals 22-1, 22-2, 22-3 includes respectively one or more filters 28. Each of the first and second gateways 24-1, 24-2 includes respectively one or more filters 30. Each of the uplink filters 26, the filters 28 and the filters 30 are filters tuned to receive bandwidths of frequencies. For example, first, second and third uplink filters 26 in the satellite 20-1 may be tuned to receive respectively the signals transmitted respectively via first, second and third uplinks 32U-1, 32U-2, 32U-3. The downlink filters 27 are tuned to limit a signal to a bandwidth prior to transmission via a downlink 32D.

First, second, and third terminals 22-1, 22-2, 22-3 are coupled respectively to the satellite 20-1 via the first, second and third uplinks 32U-1, 32U-2, 32U-3. The term "coupled" in this context means that radio frequency communications can occur between the respective terminal 22 and the satellite 20. For example, in the case of the first terminal 22-1, the first uplink 32U-1 and the satellite 20-1, "coupled" means that a transmitter in the first terminal 22-1 is tuned to a bandwidth, the first uplink 32U-1 includes this bandwidth, and a receiver on the satellite 20-1 is tuned to the bandwidth. "Coupled" in this case further means that the beam (e.g., the first beam B1) including the first uplink 32U-1 is directed from the satellite 20-1 toward to region R including the first terminal 22-1. The first, second, and third uplinks 32U-1, 32U-2 and 32U-3 are included in first, second and third beams B1, B2, B3. First gateway 24-1 is coupled to the satellite 20-1 via first and third downlinks 32D-1, 32D-3. Second gateway 24-2 is coupled to the satellite 20-1 via the second downlink 32D-2.

The first terminal 22-1 transmits first signals to the first gateway 24-1 via the first uplink 32U-1, the satellite 20-1, and the first downlink 32D-1. The second terminal 22-2 transmits second signals to the second gateway 24-2 via the second uplink 32U-2, the satellite 20-1 and the second downlink 32D-2. The third terminal 22-3 transmits third signals to the first gateway 24-1 via the third uplink 32U-3, the satellite 20 and the third downlink 32D-3.

The exemplary subnetwork 12a illustrates interference wherein a first signal transfers interfering signal energy from a second signal to a third signal. In the descriptions that follow, unless otherwise noted, first signals are signals that transfer (carry) interfering signal energy from a second signal to a third signal. Second signals are signals that inject signal energy into (interfere with) the first signal. Third signals are victim signals, so named because they are signals that are interfered with by the signal energy from the second signal, via the first signal. As will be described in additional detail below, each of the signals transferred from a terminal 22 to a gateway 24 via the satellite 20 may be a first (carrier) signal, a second (interfering) signal, and/or a third (victim) signal.

In a case where the first and second terminals 22-1, 22-2 are coupled to the satellite 20 via neighboring beams B, and the bandwidths of the first and second uplinks 32U-1, 32U-2 are adjacent, energy from the second signal may transfer to (interfere with) the first signal. The signal energy from the second signal may be carried as interference by the first signal to the first gateway 24-1.

Terminals 22 are coupled to the satellite 20 via neighboring beams B when the terminals 22 are in neighboring regions R, with each neighboring region R coupled to the satellite 20 via a respective beam B. Neighboring regions R are defined as regions that are geographically adjacent or overlapping.

Adjacent frequency bandwidths (or adjacent bandwidths) are respective uplinks having frequency bands that within a predetermined buffer bandwidth (which may be referred to herein as "the predetermined buffer") of each other, without another intervening signal of interest (e.g., another uplink 32) between them. The predetermined buffer may be determined, for example, based on characteristics of uplink filters 26 in the satellite 20 used during reception of the signals from the first and second terminals 22-1, 22-2.

Bandwidths, for example the bandwidth of an uplink 32U, have a low frequency limit and a high frequency limit. The low and high frequency limits of bandwidths are referred to herein respectively as the low end and the high end of the bandwidth.

Frequency adjacency occurs when the low end of a bandwidth of a link 32 is adjacent to the high end of a bandwidth of another link 32. For example, the low end of the bandwidth of the second uplink 32U-2 can be adjacent to the high end of the bandwidth for the first uplink 32U-1.

Energy transfer occurs between the ends of uplinks 32U or downlinks 32D that are frequency-adjacent. In the case that the low end of the second uplink 32U-2 is adjacent to the high end of the bandwidth of the first uplink 32U-1, the signal energy from the second signal transfers to the high frequency end of the first signal. In the case that the high end of the second uplink 32U-2 is adjacent to the low end of the bandwidth of the first uplink 32U-1, the signal energy transfers to the low frequency end of the first signal.

Energy from the second signal may be carried by the first signal to a third signal, such that the energy from the second signal interferes with the third signal. Energy from the second signal can be transferred to the third signal when the following conditions are met:
(1) the third signal, from the third terminal 22-3, has the same target as the first signal, (in this case, the second gateway 24-2),
(2) the bandwidth of the third downlink 32D-3 is adjacent to the bandwidth of the first downlink 32D-1, and
(3) the bandwidth of the third downlink 32D-3 is on a same end of the bandwidth of the first downlink 34-D1 as the end of the bandwidth of the second uplink 32U-2 is relative to the bandwidth of the first uplink 32U-1.

Figure 4A:
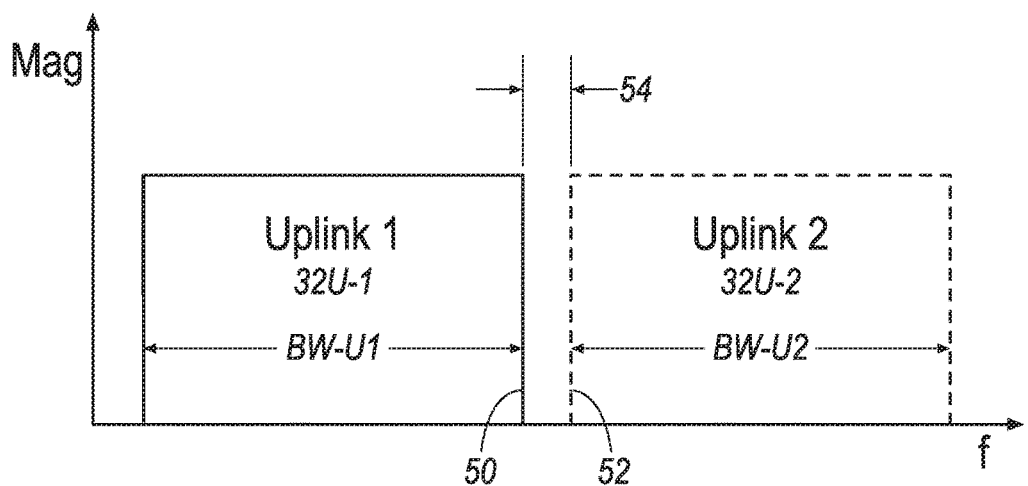
FIG. 4A is a diagram illustrating exemplary adjacent bandwidths for first and second uplinks.

FIG. 4A is a diagram illustrating exemplary, adjacent bandwidths for exemplary first and second uplinks 32U-1, 32U-2. First uplink 32U-1 has a bandwidth BW-U1. The bandwidth BW-U1 has a high end 50. The high end 50 is the highest frequency of the bandwidth BW-U1. Uplink 32U-2 has a bandwidth BW-U2. The bandwidth BW-U2 has a low end 52. The low end 52 is the lowest frequency of the bandwidth BW-U2.

There is a buffer 54 between the bandwidth BW-U1 for the first uplink 32U-1 and the bandwidth BW-U2 for the second uplink 32U-2. The buffer 54 is a bandwidth. The buffer 54 may be a system parameter established to optimize a trade-off between interference between the first uplink 32U-1 and the second uplink 32U-2 and system bandwidth utilization. System bandwidth utilization is a parameter indicating the percentage of system bandwidth being utilized for transmitting data. As the buffer 54 increases, interference decreases and system bandwidth utilization increases. Ideally, the buffer 54 is zero.

The buffer 54 is shown in FIG. 4A between the bandwidth BW-U1 for the first uplink 32U-1 and the bandwidth BW-U2 for the second uplink 32U-2. A buffer may also be used between two downlinks such as the downlink 32D-1 and 32D-3.

Figure 4B:
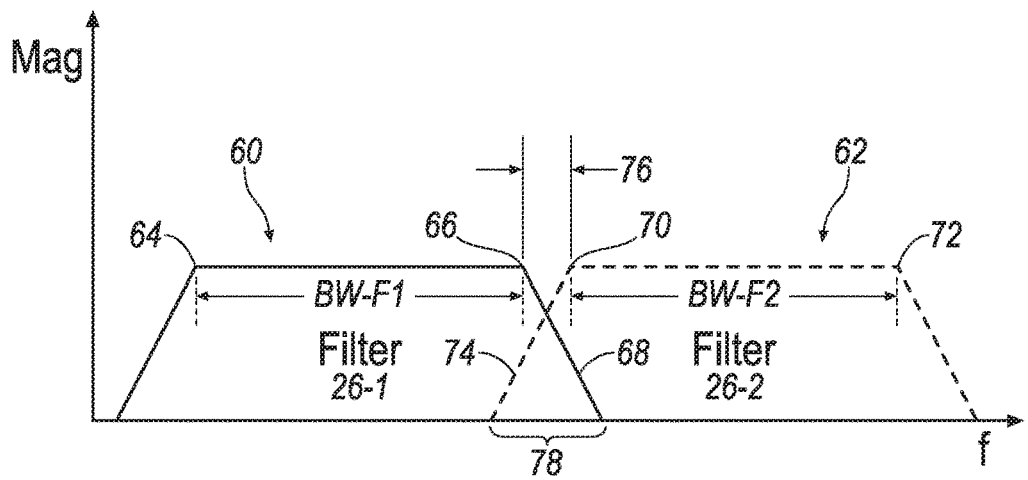
FIG. 4B is a diagram illustrating exemplary filters for the first and second uplinks of FIG. 4A.

FIG. 4B is a diagram illustrating filter characteristics for first and second uplink filters 26-1, 26-2 in the satellite 20. The first uplink filter 26-1 is the filter for receiving the first signal via the first uplink 32U-1. The second uplink filter 26-2 is the filter for receiving the second signal via the second uplink 32U-2. The first and second uplink filters 26-1, 26-2 have respective first and second filter characteristics 60, 62.

The first filter characteristic 60 has a first corner frequency 64, a second corner frequency 66 and a bandwidth BW-F1 from the first corner frequency 64 to the second corner frequency 66. "Corner frequency" is a frequency characterizing a boundary in a filter's frequency response at which signal energy of a signal being filtered begins to be reduced (attenuated). The first filter characteristic 60 further has a high frequency roll-off 68 indicating that the filter attenuation increases with increasing frequency above the first corner frequency 70. Typically, the bandwidth BW-F1 for the first uplink filter 26-1 is set to be equal to the bandwidth BW-U1 of the first uplink 32U-1.

The second filter characteristic 62 has a first corner frequency 70, a second corner frequency 72 and a bandwidth BW-F2 from the first corner frequency 70 to the second corner frequency 72. The first filter characteristic 62 further has a low frequency roll off 74 indicating that the filter attenuation increases with decreasing frequency below the first corner frequency 70. Typically, the bandwidth BW-F2 for the second uplink filter 26-2 is set to be equal to the bandwidth BW-U2 for the second uplink 32U-1.

The first and second filters 26-1, 26-2 may be dimensioned, i.e., the corner frequencies can be selected, such that there is an uplink filter buffer 76 (i.e., a bandwidth) between the second corner frequency 66 of the first uplink filter 26-1 and the first corner frequency 70 of the second uplink filter 26-2. In some cases, the uplink filter buffer 76 (bandwidth) may be set to be the same as the buffer 54 (bandwidth) (FIG. 4A) between the first uplink 32U-1 and the second uplink 32U-2.

The roll off 68 of the first uplink filter 26-1 may cross the roll-off 74 creating an overlap 78. The overlap 78 is a range of frequencies wherein energy from the second signal (being filtered by the second uplink filter 26-2) can interfere with the first signal (being filtered by the first uplink filter 26-1). That is, energy from the second signal may be picked up and carried by the first signal.

Figure 5:
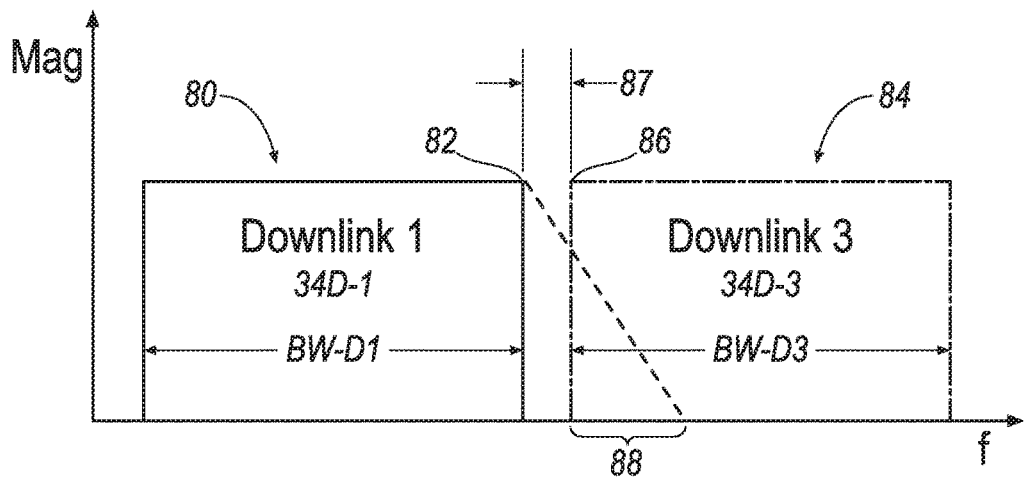
FIG. 5 is a diagram illustrating exemplary signal interference on a first signal crossing over to a third signal.

The energy from the second signal may continue to be carried by the first signal over the first downlink 32D-1. As illustrated in FIG. 5, in the case that the first downlink 32D-1 is frequency-adjacent with a third downlink 32D-3, the energy from the second signal may interfere with the third signal.

FIG. 5 illustrates an overlap between the beam B1 carrying the first signal together with interference with the second signal, and beam B2. The downlink 32D-1 in beam B1 has an energy distribution 80. The energy distribution 80 begins to decrease at a frequency 82. At frequencies higher than the frequency 82, the magnitude decreases in with increasing frequency. The energy in beam B1 at frequencies beyond the frequency 82 includes at least partially energy from the second signal, which was picked up as interference.

The third downlink 34-D3 in beam B2 has an energy distribution 84. The energy distribution 84 of beam 2 drops to zero at a frequency 86. There may be a downlink filter buffer 87 (bandwidth) between the frequency 82 and the frequency 86.

Due to the energy in the first signal (signal carried by beam B1) beyond the frequency 82, there exists an overlap 88 in the beam B1 energy distribution 80 and the beam B3 energy distribution 84. This overlap 88 is a frequency range in which signal energy from the second signal, as carried by the first signal, interferes with the third signal.

A computer, for example the computer 14, can be programmed to determine whether the interference from a second signal, on a third signal, via a first signal, can cause system performance loss. The system interference levels are primarily a function of the satellite filter characteristics (frequency response) for the first and second uplink filters 26-1, 26-2 and third downlink filter 27-3. There are two criteria that need to be satisfied for the system interference to cause performance loss.

The first criterion is a level of interference between the first signal and the second signal. This can be determined based on the filter characteristics of the first and second uplink filters 26-1, 26-2. There are two cases to be considered for the first criterion.

Figure 6:
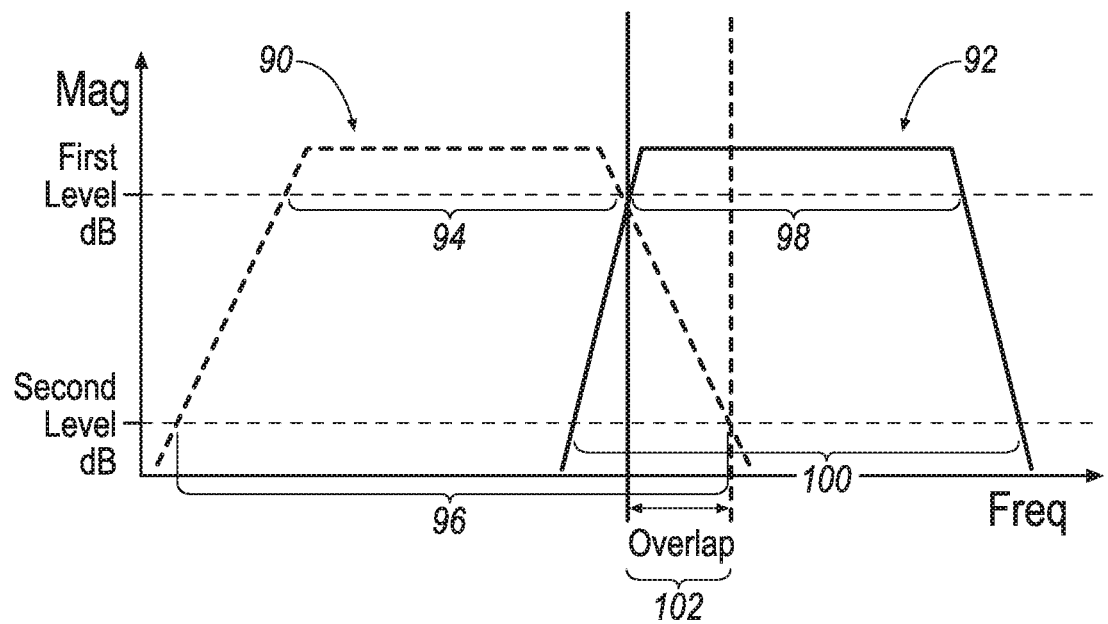
FIG. 6 is a first diagram of exemplary filter characteristics for frequency-adjacent first and second uplinks.
Figure 7:
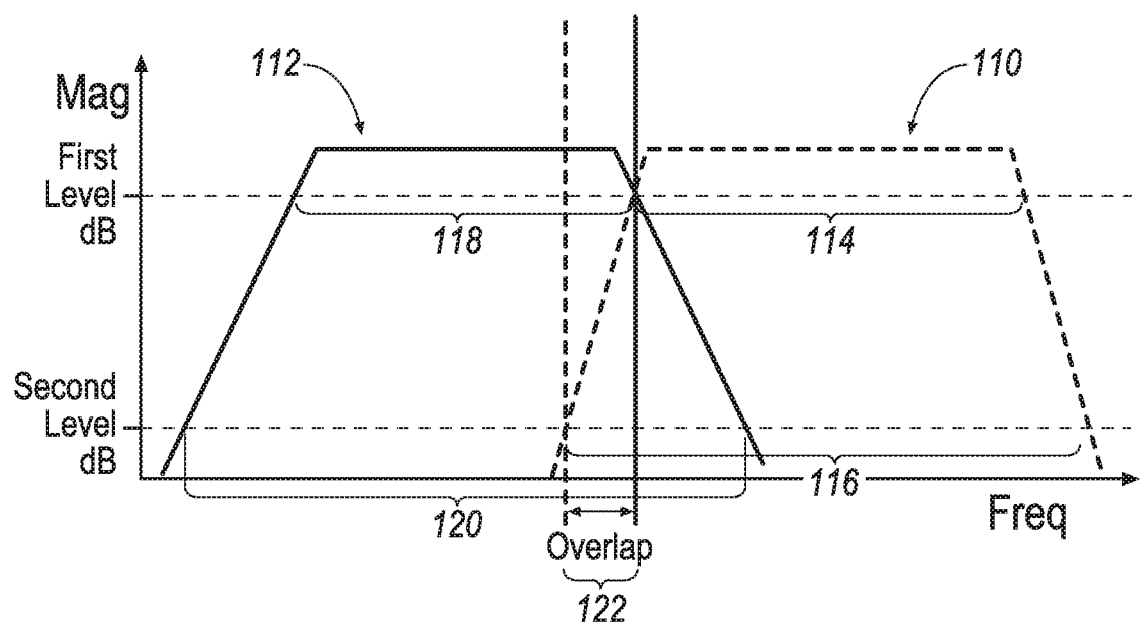
FIG. 7 is a second diagram of exemplary filter characteristics for frequency-adjacent first and second uplinks.

FIG. 6 addresses a first case, in which the second (interfering) signal, has a bandwidth that is adjacent on the high end of the first (carrier) signal. FIG. 7 addresses a second case, in which the second (interfering) signal has a bandwidth that is adjacent on the low end of the first (carrier) signal.

FIG. 6 illustrates an exemplary first filter characteristic 90 for a first uplink filter 26-1 and a second filter characteristic 92 for a second uplink filter 26-2. The first filter characteristic 90 has a first attenuation level bandwidth 94 and a second attenuation level bandwidth 96. The second filter characteristic has a first attenuation level bandwidth 98 and a second attenuation level bandwidth 100.

The first and second attenuation levels may be selected for the first network 12 to determine whether the interference between the first and second signals meet or exceed the first criterion. In one example, the first attenuation level may be set to 2.5 decibels (dB), and the second attenuation level may be set to 15 decibels (dB).

The first criterion in the first case can be set to be that the first uplink filter's second attenuation level bandwidth is higher than the second uplink filter's first attenuation level bandwidth. This is illustrated by the overlap 102 in FIG. 6.

FIG. 7 illustrates an exemplary first filter characteristic 110 for a first uplink filter 26-1 and a second filter characteristic 112 for a second uplink filter 26-2. The first filter characteristic 110 has a first attenuation level bandwidth 114 and a second attenuation level bandwidth 116. The second filter characteristic 112 has a first attenuation level bandwidth 118 and a second attenuation level bandwidth 120.

The first criterion, in the second case can be specified to be that the first filter characteristic 110 second attenuation level bandwidth 116 extends below the second filter characteristic 112 first attenuation level bandwidth 118. This is represented by the overlap 122.

The second criterion is a level of interference between the first signal and a third signal sharing a same target (e.g., gateway 24). The second criterion can be specified to be any part of the overlap between the first and second signals extending within a first attenuation level bandwidth of the third signal's downlink filter 27-3.

Figure 8:
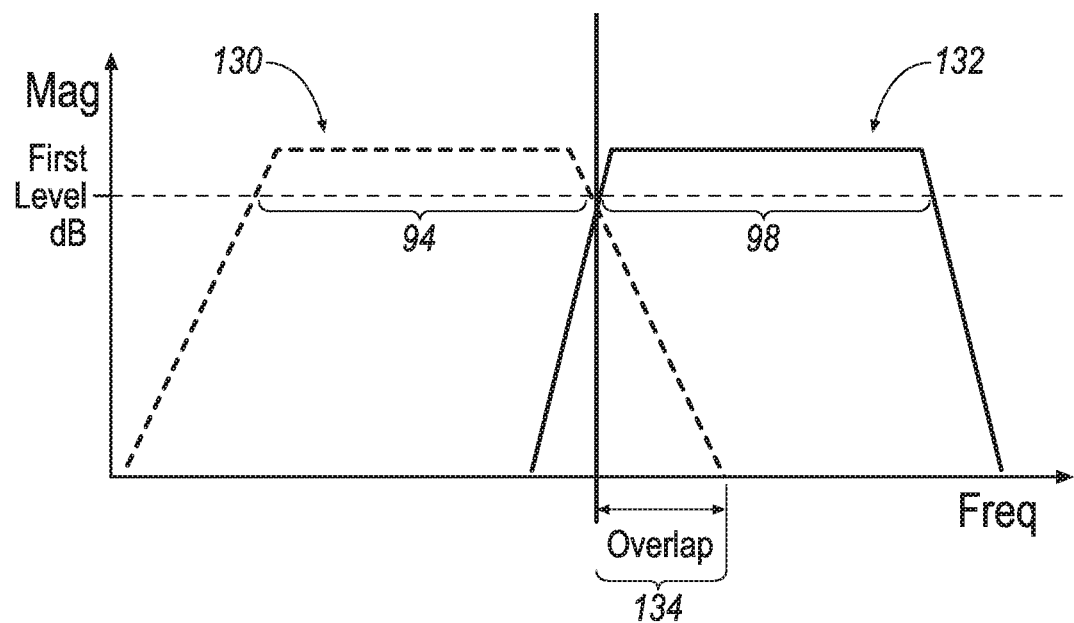
FIG. 8 is a diagram of exemplary filter characteristics for downlink filters associated with downlinks.

FIG. 8 illustrates an exemplary first filter characteristic 130 for a first downlink filter 27-1 and a second filter characteristic 132 for a second filter 27-3. The satellite 20-1 is programmed to utilize the first downlink filter 27-1 to filter the first signal prior to transmission, via the downlink 32D-1 to the first gateway 24-1. The first signal includes signal energy from the second signal. The satellite 20-1 is further programmed to utilize the second downlink filter 27-3 to filter the third signal prior to transmission, via the third downlink 32D-3 to the first gateway 24-1.

The second satellite downlink filter 27-3 may have a first attenuation level bandwidth. The first attenuation level bandwidth is the bandwidth of the downlink filter 27-3 at a first level of attenuation. The first level of attenuation may be, for example, 2.5 decibels (dB). An overlap 134 represents the portion of the first signal that extends beyond into the first level bandwidth of the downlink filter 27-3 for the third signal. The portion of the first signal, within the overlap 134, may include signal energy from the second signal.

In a system such as the first network 12, there may exist multiple triplets of a first signal, second signal and third signal, wherein an overlap in a first signal and second signal during uplink transmissions results in the first signal transferring energy from the second signal to a third signal during subsequent downlink transmissions.

Figure 9:
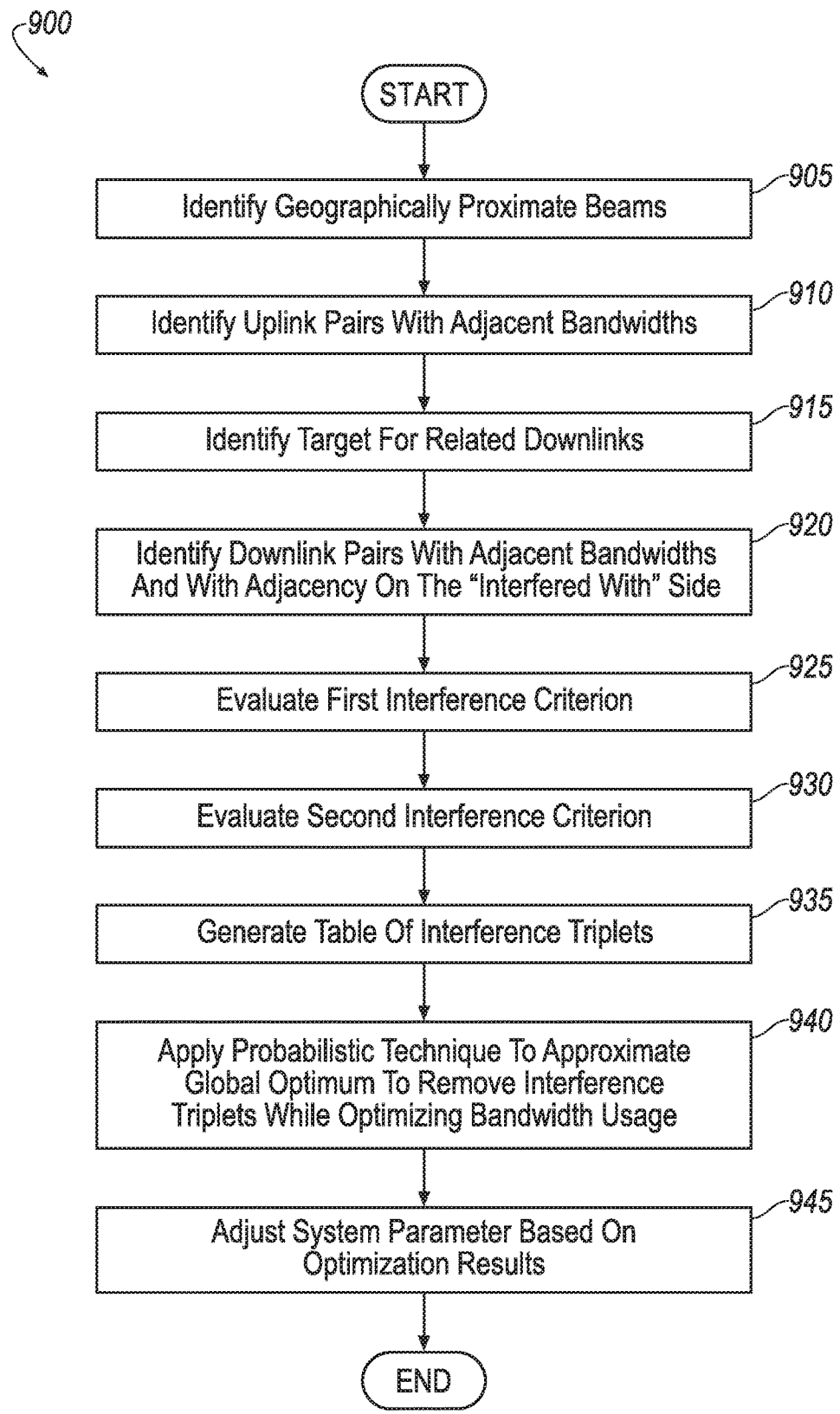
FIG. 9 is a diagram of an exemplary process for interference reduction with optimized bandwidth utilization.

FIG. 9 is a flow diagram of an exemplary process 900 for identifying these triplets within the first network 12, and reducing bandwidths of selected first and/or third signals in each of the triplets, to reduce interference while optimizing bandwidth utilization of the first network 12. The process 900 may be carried out according to programming in the computer 14. The process 900 begins in a block 905.

In the block 905, the computer 14 is identifies pairs of beams that are neighbors. As discussed in reference to FIGS. 2A and 2B, each beam B is associated with a region R. For regions R organized in a hexagon lattice (see FIG. 2B), each region associated with a beam B may have six neighbor regions R. The beams B for communications respectively between the satellite 20 and neighbor Regions R are neighbor beams B. For example, the beam B for communications between the satellite 20 and the region R6 has six neighbor beams B for communications respectively between the satellite 20 and neighbor regions R. In the case of region R6, the neighbor beams are the beams B for communications respectively between the satellite 20 and the regions R2, R3, R7, R11, R10 and R5. The process 900 continues in a block 910.

In the block 910, the computer 14 is programmed to identify, within each of pair of neighbor beams, pairs of uplinks 32 that have adjacent bandwidths. These pairs may be referred to herein as first channel/second channel pairs. The process 900 continues in a block 915.

In the block 915, the computer 14 is programmed to identify the gateway 24 and associated first downlink 34 assigned to the first channel in each first channel/second channel pair. The process 900 then continues in a block 920.

In the block 920, the computer is programmed to identify third channel downlinks 34 that may be subject to interference from the first channel, at each respective gateway 24. The computer 14 is programmed to identify the third downlinks 34 assigned to each respective gateway 24 that have bandwidths adjacent to the first downlink 34 for the first signal.

The computer 14 is further programmed to identify third channels that are on a same side (frequency end) of the first channel as the second channel was during the uplink transmission. In the case that the second channel was on the high frequency end of the uplink 32 for the first signal, the computer 14 identifies third channels that are also adjacent to the high end of the first downlink 34 for the first signal. In the case that the second channel was on the low frequency end of the uplink 32 for the first signal, the computer 14 identifies third channels that are adjacent to the low frequency end of the first downlink 34 for the first signal. The first channel, second channel and third channel that fulfill these criteria are potential interference triplets. The process 900 continues in a block 925.

In the block 925, the computer 14 is programmed to evaluate the first channel/second channel pair in each potential interference triplet according to the first interference criterion. As described above in reference to FIGS. 6 and 7, the computer 14 is programmed to determine whether there is a bandwidth overlap between the uplink filter 26 associated with the first channel and the uplink filter 26 associated with second channel. In the case that there is an overlap, the first criterion is met. The process 900 continues in a block 930.

In the block 930, the computer 14 is programmed to evaluate the first channel/third channel pair in each interference triplet. As described in reference to FIG. 8, in the case that there is an overlap between (1) the first channel/second channel overlap and (2) a bandwidth of the downlink filter 27 for the third signal, the second criterion is fulfilled. The process 900 continues in a block 935.

In the block 935, the computer 14 is programmed to generate a table of interference triplets. The computer 14 removes from the list of potential interference triplets each of the potential interference triplets that fail to meet both the first and second criteria. Table 1 below is an example portion of table of interference triplets. The process 900 then continues in a block 940.

TABLE 1

| First Channel | Second Channel | Third Channel | First Channel/ Second Channel Overlap (MHz) | First Channel/ Third Channel Overlap (MHz) | Upper Lower End |
|---|---|---|---|---|---|
| Y102K | Y101E | Y47L | 0.1 | 0.9485 | U |
| Y22I | Y23J | Y88J | 0.9 | 0.8855 | U |
| Y22I | Y21J | Y88J | 0.9 | 0.8855 | U |
| Y84BFE | Y68IJ | Y30CD | 0.2 | 1.43 | U |
| Y26C | Y27J | Y80D | 1.3 | 0.8775 | U |
| Y26C | Y25J | Y80D | 1.3 | 0.8775 | U |

In the block 940, the computer 14 is programmed to apply a probabilistic technique to approximate a global optimum to remove interference triplets while optimizing bandwidth usage within the first network 12. The probabilistic technique of simulated annealing is an example of an optimization technique that can be applied. Other probabilistic techniques may also be used.

Overlaps leading to energy transfer from a second channel in an interference triplet to a third channel in the interference triplet (via the first channel) need to be left unused. In each interference triplet, it is sufficient to remove one of the first channel/second channel overlap and the first channel/third channel overlap.

The first signal/second signal overlap can be removed, for example, by leaving a portion of the second channel bandwidth unused where it is adjacent to the first channel. The first channel/third channel overlap can be removed by leaving a portion of the third signal bandwidth unused. Leaving a portion of a signal bandwidth unused potentially reduces or eliminates the interference of multiple interference triplets. The amount of reduction in usable bandwidth will directly affect the first network 12 capacity and must be minimized. The number of beams and potential reuse patterns may be high, such the state space for the search of the optimum solution becomes vast. Simulated annealing is an example of a probabilistic technique to find the global optimum in a large search space.

The computer 14 may be programmed to apply simulated annealing to approximate the global optimum to remove the interference triplets while optimizing bandwidth usage. Simulated annealing seeks to optimize a "state" of the first network 12. The state of the first network 12 is defined as the individual reduction of bandwidth of both second (interfering) and third (victim) bandwidths on both upper and lower frequency sides of the channel (uplink and downlink) for the respective second and third signals. Table 2, below, shows and example state.

TABLE 2

| Channel Number | Reduction_Lower (MHz) | Reduction_Upper (MHz) |
|---|---|---|
| Y101E | 0.3 | 0.1 |
| Y102K | 0 | 0 |
| Y23J | 0.5 | 0 |
| Y21J | 0.4 | 0 |
| Y68IJ | 0.1 | 0.1 |
| Y27J | 0.1 | 0 |

The initial state may be chosen as the worst-case solution with the maximum bandwidth reduction across the system applied to all the second and third beams on each frequency side of each channel. The "energy" of the state is defined as the sum of all reductions (both lower and upper frequency). Simulated annealing seeks to minimize the energy of the state.

An additional constraint on the solution is that for each interference triplet, at least one of the first channel/second channel overlap and the first channel/third channel overlap must be zero. The computer 14 is programmed not to consider states where this constraint is not satisfied. As the computer 14 identifies potential solutions to reducing interference according to this constraint by bandwidth reductions to second (interfering) and third (victim) channels. As each potential solution is identified, the solution is checked for conformance with the constraint.

Simulated annealing adjusts an acceptance criteria for a solution based on a parameter called system temperature T. The system temperature T is a parameter, used by the computer 14, to adjust a probability of accepting a new solution for the bandwidth reduction as opposed to maintaining a previous solution. The system temperature T decreases with each iteration of identifying and evaluating a new solution. The rate of decrease of the system temperature and a number of iterations for a simulation are determined based on a size of the first network 12 that is being optimized, the computing speed of the computer 14, and desired simulation run time.

An acceptance probability P of a new state decreases with the system temperature T, via the function:

$$P = \exp(E(S) - E(S'))/T \qquad \text{Eq. 1}$$

Where E(S) is the energy of the system, and E(S') is energy of the new state. For example, system temperature T may decrease linearly from one to zero for the number of planned iterations of the simulation.

A higher system temperature T allows for larger changes in state from iteration to iteration, to reduce the likelihood that the probabilistic optimization technique does not get stuck in a local energy minimum during an early portion of a simulation run. Due to the changing acceptance probability, the likelihood of choosing a neighbor state with similar energy to a current state increases as the system cools down.

An example algorithm for simulated annealing is presented below.

In the block 945, the computer 14 adjusts the first network 12 based on reductions in usable bandwidth of the second and third beams. For example, the computer 14 may transmit instructions to the satellite 20 to adjust the characteristics such as the bandwidth or steepness of one or more uplink filters 26 and one or more downlink filters 27 in the first network 12. The computer 14 may further transmit instructions to one or more terminals 22 to adjust characteristics such as bandwidths or steepness of filters 28 and to one or more gateways 24 to adjust characteristics such bandwidths or steepness of filters 30.

Additionally or alternatively, computer 14 may adjust/set buffers (unused bandwidths) such as the buffer 54 between frequency adjacent uplinks 32 (FIG. 4A), a buffer between adjacent downlinks, the uplink filter buffer 76 between uplink filters 26 for frequency adjacent uplinks 32 (FIG. 4B), or the downlink filter buffer 87 between downlink filters 27 (FIG. 5). The gateway 24 may store the buffers 54, uplink filter buffers 76 and downlink filter buffers 87 such that no bandwidth allocation is made in one or more of these buffers.

Figure 10:
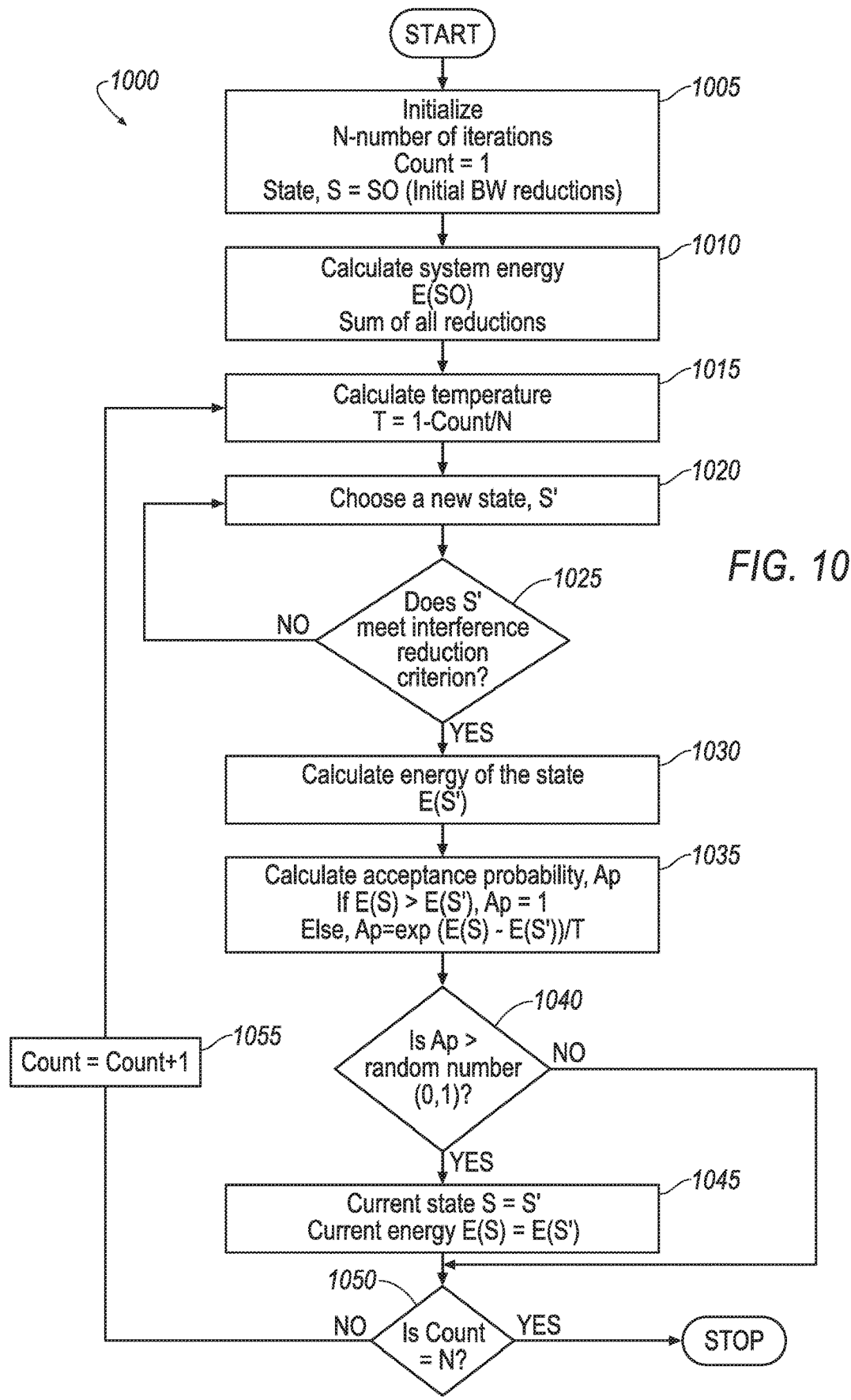
FIG. 10 is a diagram of an example process for simulated annealing.

FIG. 10 is a flow diagram for an exemplary process 1000 for implementing simulated annealing in the present context. The process 1000 begins with a block 1005.

In the block 1005, the computer 14 initiates variables N and Count, and determines an initial system state SO. N is a number of iterations for the simulated annealing and may be determined based on a size of the first network 12 that is being optimized, the computing speed of the computer 14, and desired simulation run time. The more extensive the search space, the higher N should be. Each run of the simulation will identify one possible solution.

In an example first network 12, the reductions in bandwidth are quantized to 0.1 MHz. There are approximately 120 sets of interference triplets, each considered twice to account for second channel (interferer) and third channel (victim) reductions. In an example, the maximum reduction for each bandwidth is in a range of 7 MHz. This results in

---

Simulated Annealing Algorithm

```
# run N times
for counter in (0, NO_RUNS):
    temperature= 1-counter/NO_RUNS; # temperature decreases as the simulation
progresses
 # choose a new state
    new_state=[ ];
    choose_new_state(current_state, overlap_data, new_state);
 # don't search those that don't meet the criteria
        while check_constraint(new_state, overlap_data,reduction_data_initial)==False:
            new_state=[ ];
            choose_new_state(current_state,overlap_data,new_state);
# calculate energy/cost of the new state
    new_energy=energy(new_state);
# check acceptance probability
    ap=acceptance_prob(new_energy,current_energy,temperature);
# if acceptance probability is sufficient change the current state to the new state
    if ap > random_number:
        current_state=new_state
        current_energy=new_energy;
```

---

An example process 1000, for implementing simulated annealing, is described below, with reference to FIG. 10. The process 900 may call the process 1000 from the block 940.

When the simulated annealing search is completed, for example, at the end of the process 1000, the 'state' of the system gives us the reductions in usable bandwidth of the second and third beams. The process 900 then continues in a block 945.

a search space of 70**240 (70 to the power of 240) combinations. In this example, N was selected to be 1 million, and resulted in a run time of 30 minutes. Increasing N will result in a longer run time, and an increased probability of finding a more optimal solution (a solution requiring a smaller overall reduction in bandwidth).

Count is an index that tracks the number of iterations that have been performed. Count is set to one (Count=1) in the block 1005. SO is the initial state of the system 12. It may be determined, for example, as the state in which all the first channel/second channel overlaps and all the first channel/third channel overlaps are removed. The process 1000 continues in a block 1010.

In the block 1010, the computer 14 is programmed to calculate the system energy E(SO) for the initial system state SO. The system energy E(SO) is the sum of all bandwidth reductions made to remove the first channel/second channel overlaps and first channel/third channel overlaps. The process 1000 continues in a block 1015.

In the block 1015, the computer 14 calculates the system temperature T=(1−Count)/N. The process 1000 continues in a block 1020.

In the block 1020, the computer 14 is programmed to choose a new state S' for the system 12. The computer 14 identifies a set of random reductions of the second channel and third channel bandwidths between zero and a maximum reduction. The maximum reduction for each second and third channel bandwidth is the bandwidth reduction determined in the initial state of the system 12. In the example, as described above, the initial state is the state in which all of the first channel/second channel overlaps and all of the first channel/third channel overlaps are removed. Choosing the new state S' includes identifying a potential solution to reducing interference with bandwidth reductions to second (interfering) and third (victim) channels. Upon identifying a potential solution, the process 1000 continues in a block 1025.

In the block 1025, the computer 14 determines whether the new state S' meets the interference reduction criterion which is that at least one of the first channel/second channel overlap and the first channel/third channel overlap in each interference triplet in the new state S' is removed. In the case that S' meets the interference reduction criterion, the process 1000 continues in a block 1035. Otherwise, the process 1000 continues in the block 1020.

In the block 1030, the computer 14 is programmed to calculate the energy of the new state S'. The computer 14 calculates the total bandwidth reduction associated with the new state S'. The process 1000 continues in a block 1035.

In the block 1035, the computer 14 is programmed to calculate an acceptance probability, Ap, according to the following criteria.

If E(S)>E(S'), Ap=1.
If E(S)<E(S'), Ap=exp (E(S)−E(S'))/T.

S is the current state of the system. S' is the new state of the system. E(S) is energy of the system for the current state S. E(S') is the system energy for the new state S'. The process 1000 continues in a block 1040.

In the block 1040, the computer 14 determines whether Ap is greater than a random number in a range from zero to one. The random number may be, for example, a pseudo-random number generated by the computer 14. In the case that Ap is greater than the random number, the process 1000 continues in a block 1045. In the case that Ap is less than or equal to the random number, the process 1000 continues in a block 1050.

In the block 1045, the computer 14 is programmed to update the current state S=S' and the current energy of the system E(S)=E(S'). The process continues in the block 1050.

In the block 1050, the computer 14 is programmed to determine whether Count is equal to N. In the case that Count is equal to N, the process 1000 ends. In the case that Count is less than N, the process 1000 continues in a block 1055.

In the block 1055, the computer 14 programmed to increment Count=Count+1. The process 1000 continues in the block 1015.

When the process 1000 ends, in the case that the process 1000 is called by the process 900, the process 900 continues with the block 945.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A computer comprising a processor; and a memory, the memory storing instructions executable by the processor to:
   for a plurality of channels including a first, a second, and a third channel, identify the second channel interfering with the first channel causing interference in the third channel;
   based on the identification and using a simulated annealing algorithm, optimize a bandwidth reduction across the plurality of sets of channels by adjusting at least one of (1) characteristics of one or more filters included respectively in one or more of a satellite, a terminal, and target gateway; (2) a buffer between uplink bandwidths; (3) a buffer between downlink bandwidths; (4) a buffer between uplink filters; and (5) a buffer between downlink filters,
   wherein
   the first channel is in a first satellite beam and the second channel is in a second satellite beam neighboring the first satellite beam,
   the first and second channels comprise a first uplink and a second uplink, respectively,
   the first and second uplinks comprise a first bandwidth overlap,
   the first and third channels share a target gateway,
   the first and third channels comprise a first downlink and a third downlink, respectively,
   the first and third downlinks comprise a second bandwidth overlap, and
   the second bandwidth overlap comprises a bandwidth that shares a common signal spectrum with the first bandwidth overlap; and
   communicate with a satellite communication network including a satellite, one or more terminals and the target gateway.

2. The computer of claim 1, wherein optimizing the bandwidth reduction across the plurality of sets of channels includes programming to:
   minimize at least one of the first bandwidth overlap and the second bandwidth overlap respectively in each set of channels.

3. The computer of claim 1, wherein the first neighbor beam couples a first region and a satellite, wherein the second neighbor beam couples a second region and the satellite and the first and second regions are adjacent.

4. The computer of claim 1, wherein optimizing the bandwidth reduction comprises reducing bandwidth in the second uplink, the third downlink, or both.

5. The computer of claim 1, wherein optimizing the bandwidth reduction across the plurality of sets of channels includes programming to:
   determine the first bandwidth overlap based on a first filter characteristic for the first uplink and a second filter characteristic for the second uplink; and
   determine the second bandwidth overlap based on a third filter characteristic for the third downlink.

6. The computer of claim 1, wherein optimizing the bandwidth reduction across the plurality of sets of channels includes programming to:
   identify, based on an optimization technique for approximating a global optimum, sets of bandwidth reductions; and
   select, from the sets of bandwidth reductions, a set of bandwidth reductions that optimizes the bandwidth reduction.

7. The computer of claim 6, wherein identifying, based on the optimization technique for approximating the global optimum, sets of bandwidth reductions includes programming to minimize the second bandwidth overlap.

8. The computer of claim 6, wherein the optimization technique for approximating the global optimum is based on simulated annealing.

9. A method, comprising:
   for a plurality of channels including a first, a second, and a third channel, identifying the second channel interfering with the first channel causing interference in the third channel;
   based on the identification and using a simulated annealing algorithm, optimizing a bandwidth reduction across the plurality of sets of channels by adjusting at least one of (1) characteristics of one or more filters included respectively in one or more of a satellite, a terminal, and target gateway; (2) a buffer between uplink bandwidths; (3) a buffer between downlink bandwidths; (4) a buffer between uplink filters; and (5) a buffer between downlink filters,
   wherein
   the first channel is in a first satellite beam and the second channel is in a second satellite beam neighboring the first satellite beam,
   the first and second channels comprise a first uplink and a second uplink, respectively,
   the first and second uplinks comprise a first bandwidth overlap,
   the first and third channels share a target gateway,
   the first and third channels comprise a first downlink and a third downlink, respectively,
   the first and third downlinks comprise a second bandwidth overlap, and
   the second bandwidth overlap comprises a bandwidth that shares a common signal spectrum with the first bandwidth overlap; and
   communicating with a satellite communication network including the target gateway.

10. The method of claim 9, wherein optimizing the bandwidth reduction across the plurality of sets of channels comprises:
    minimizing at least one of the first bandwidth overlap and the second bandwidth overlap respectively in each set of channels.

11. The method of claim 9, wherein the first neighboring beam couples a first region and a satellite, wherein the second neighbor beam couples a second region and the satellite, wherein the first and second regions are adjacent.

12. The method of claim 9, wherein optimizing the bandwidth reduction comprises reducing bandwidth in the second uplink, the third downlink, or both.

13. The method of claim 9, wherein optimizing the bandwidth reduction across the plurality of sets of channels comprises:

determining the first bandwidth overlap based on a first filter characteristic for the first uplink and a second filter characteristic for the second uplink.

14. The method of claim 9, wherein optimizing the bandwidth reduction across the plurality of sets of channels comprises:
identifying, based on an optimization technique for approximating a global optimum, sets of bandwidth reductions; and
selecting, from the sets of bandwidth reductions; a set of bandwidth reductions that optimizes the bandwidth reduction.

15. The method of claim 14, wherein identifying, based on the optimization technique for approximating the global optimum, sets of bandwidth reductions includes programming to minimize the second bandwidth overlap.

16. The method of claim 14, wherein the optimization technique for approximating the global optimum is based on simulated annealing.

17. A system, comprising:
a network comprising:
a satellite, one or more terminals and one or more gateways; and
a computer communicatively coupled to the network and including a processor and a memory, the memory storing instructions executable by the processor, wherein the instructions executable by the processor and stored in memory comprise to:
for a plurality of channels including a first, a second, and a third channel, identify the second channel interfering with the first channel causing interference in the third channel;
based on the identification and using a simulated annealing algorithm, optimize a bandwidth reduction across the plurality of sets of channels by adjusting at least one of (1) characteristics of one or more filters included respectively in one or more of a satellite, a terminal, and target gateway; (2) a buffer between uplink bandwidths; (3) a buffer between downlink bandwidths; (4) a buffer between uplink filters; and (5) a buffer between downlink filters,
wherein
the first channel is in a first satellite beam and the second channel is in a second satellite beam neighboring the first satellite beam,
the first and second channels comprise a first uplink and a second uplink, respectively,
the first and second uplinks comprise a first bandwidth overlap,
the first and third channels share a target gateway,
the first and third channels comprise a first downlink and a third downlink, respectively,
the first and third downlinks comprise a second bandwidth overlap, and
the second bandwidth overlap comprises a bandwidth that shares a common signal spectrum with the first bandwidth overlap; and
communicate with a satellite communication network including a satellite, one or more terminals and the target gateway.

18. The system of claim 17, wherein the satellite includes at least one of:
(1) one or more filters including respective filter characteristics adjusted to optimize the bandwidth reduction; and
(2) a computer programmed to include a buffer between adjacent uplink bandwidths to optimize the bandwidth reduction.

* * * * *